(12) United States Patent
Choi et al.

(10) Patent No.: US 11,953,062 B2
(45) Date of Patent: Apr. 9, 2024

(54) ONE-WAY CLUTCH REGENERATIVE BRAKING SYSTEM

(71) Applicant: NEOOTO CO., LTD., Seoul (KR)

(72) Inventors: Duk Soon Choi, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 17/938,939

(22) Filed: Sep. 7, 2022

(65) Prior Publication Data

US 2023/0073697 A1 Mar. 9, 2023

(30) Foreign Application Priority Data

Sep. 9, 2021 (KR) .......................... 10-2021-0120538

(51) Int. Cl.
| | |
|---|---|
| *F16D 41/064* | (2006.01) |
| *F16D 11/00* | (2006.01) |
| *F16D 11/14* | (2006.01) |
| *F16D 23/14* | (2006.01) |

(52) U.S. Cl.
CPC ...... *F16D 41/064* (2013.01); *F16D 2011/002* (2013.01); *F16D 2011/008* (2013.01); *F16D 11/14* (2013.01); *F16D 2023/141* (2013.01)

(58) Field of Classification Search
None
See application file for complete search history.

(56) References Cited

U.S. PATENT DOCUMENTS

| | | | |
|---|---|---|---|
| 2014/0188358 A1 | 7/2014 | Joeng | |
| 2019/0301577 A1* | 10/2019 | Harada | F16H 61/0213 |
| 2021/0364064 A1* | 11/2021 | Park | F16H 3/089 |
| 2022/0221054 A1* | 7/2022 | Zhong | F16H 55/17 |
| 2022/0397164 A1* | 12/2022 | Geiser | F16D 41/04 |

FOREIGN PATENT DOCUMENTS

| | | |
|---|---|---|
| KR | 1020140086685 | 7/2014 |
| KR | 1020180122053 | 11/2018 |

OTHER PUBLICATIONS

"Office Action of Korea Counterpart Application", dated Feb. 15, 2023, with English translation thereof, p. 1-p. 6.

\* cited by examiner

*Primary Examiner* — Timothy Hannon
(74) *Attorney, Agent, or Firm* — JCIPRNET

(57) ABSTRACT

A one-way clutch regenerative braking system includes a sleeve which is arranged on an outer circumference of a hub and moved in an axial direction, a clutch gear which is arranged on a side of the hub and meshed with the sleeve, and a one-way clutch which is arranged on an inner circumference of the hub and rotated in a first direction, wherein, when the sleeve and the clutch gear are meshed with each other, the clutch gear is rotated in a second direction which is opposite to a rotational direction of the one-way clutch.

5 Claims, 8 Drawing Sheets

ONE-WAY CLUTCH REGENERATIVE BRAKING SYSTEM

TECHNICAL FIELD

Embodiments of the disclosure relate to a one-way clutch regenerative braking system.

BACKGROUND ART

In general, an automatic transmission for a vehicle transmits power through a wet multi-plate clutch. The wet multi-plate clutch includes several thin friction plates that are stacked one after another on a drive shaft and a driven shaft and coupled by splines, and power is transmitted through hydraulic control. Using such a wet multi-plate clutch method allows transmission of power for regenerative braking regardless of a direction of power.

However, a power transmission structure through a wet multi-plate clutch has slow responsiveness due to hydraulic control and is sensitive to clutch durability and thus requires delicate control. For this reason, a wet multi-plate clutch of an automatic transmission power transmission system according to the related art is to be manufactured with great precision, and parts thereof need be manufactured for each thickness so as to maintain a certain gap. In addition, in the wet multi-plate clutch structure according to the related art uses a power transmission method by friction, and thus a considerable amount of power is lost due to the frictional force when power is transmitted.

DESCRIPTION OF THE INVENTION

Problem to be Solved

One or more embodiments include a one-way clutch regenerative braking system having a simplified structure to minimize power loss and reinforce the assembly and the structural stability.

However, the above objectives are exemplary, and the disclosure is not limited by the above objectives.

Means for Solving Problem

According to one or more embodiments, a one-way clutch regenerative braking system includes a sleeve which is arranged on an outer circumference of a hub and moved in an axial direction, a clutch gear which is arranged on a side of the hub and meshed with the sleeve, and a one-way clutch which is arranged on an inner circumference of the hub and rotated in a first direction, wherein, when the sleeve and the clutch gear are meshed with each other, the clutch gear is rotated in a second direction which is opposite to a rotational direction of the one-way clutch.

In the one-way clutch regenerative braking system according to an embodiment, the clutch gear may include a plurality of gear teeth, and the plurality of gear teeth may each include a first chamfer, and the sleeve may include a plurality of gear teeth, and the plurality of gear teeth may each include e a second chamfer.

In the one-way clutch regenerative braking system according to an embodiment, the first chamfer and the second chamfer may be formed such that a first chamfer surface and a second chamber surface contact each other.

In the one-way clutch regenerative braking system according to an embodiment, a bonding surface where the first chamfer and the second chamfer contact each other may be inclined in a direction in which the sleeve and the clutch gear are meshed with each other and in a direction in which the clutch gear is rotated in the second direction.

In the one-way clutch regenerative braking system according to an embodiment, a torsion spring may be arranged between the one-way clutch and the clutch gear.

In the one-way clutch regenerative braking system according to an embodiment, the torsion spring may exert an elastic force on the clutch gear in the second direction.

The one-way clutch regenerative braking system may further include a fork that meshes the sleeve with the clutch gear when power is transmitted to the one-way clutch.

The one-way clutch regenerative braking system according to an embodiment may be mounted in an electric vehicle.

In addition to the aforesaid details, other aspects, features, and advantages will be clarified from the following drawings, claims, and detailed description.

Effects of the Invention

According to a one-way clutch regenerative braking system, according to an embodiment, a structure with less parts and weight may be provided compared to a wet multi-plate clutch system according to the related art.

According to the one-way clutch regenerative braking system, according to an embodiment, the responsiveness of a transmission may be improved through a one-way clutch structure.

Also, according to the one-way clutch regenerative braking system, according to an embodiment, parts for measuring a gap for each thickness are unnecessary, thereby improving the assembly and maintenance of the system and reducing the cost.

Moreover, the one-way clutch regenerative braking system, according to an embodiment, is a regenerative braking system that uses a mechanical securing method between chamfer portions of meshed gears, and according to the one-way clutch regenerative braking system, power loss may be minimized based on the structural stability.

MODE FOR CARRYING OUT THE INVENTION

Figure 1:
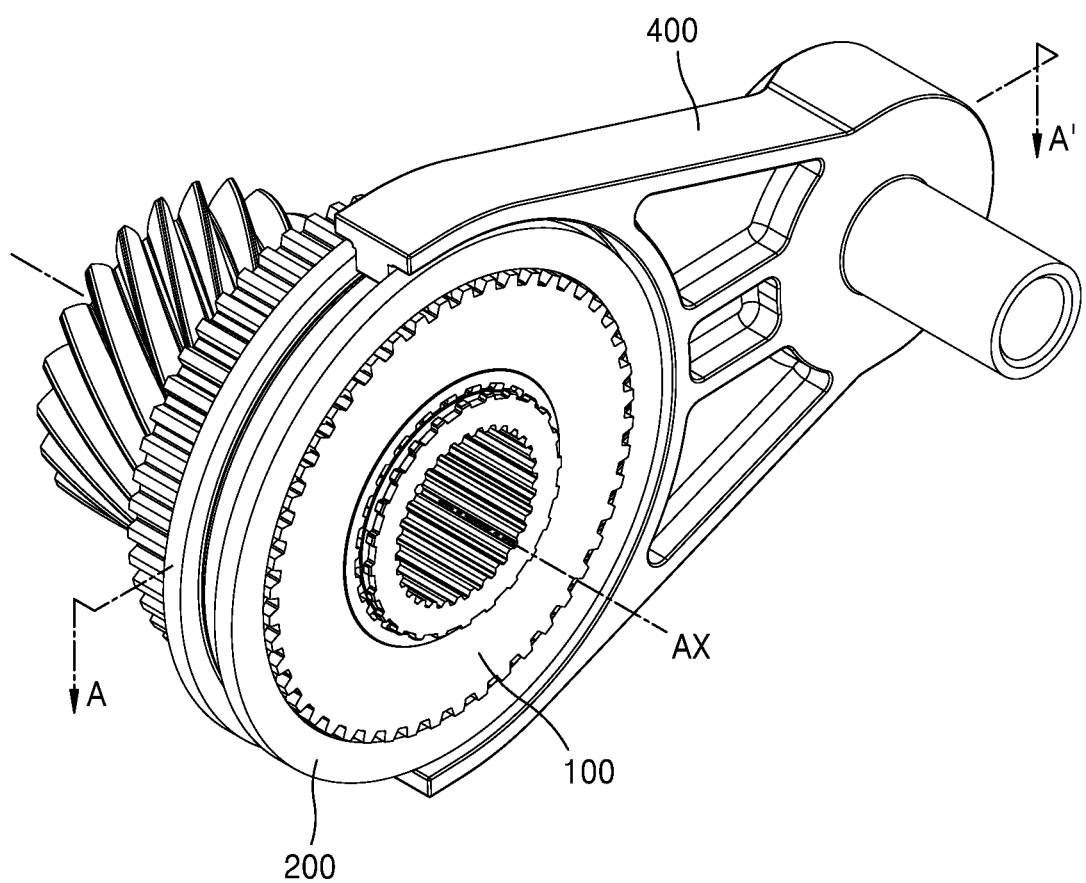
FIG. 1 is an assembled perspective view of a one-way clutch regenerative braking system according to an embodiment.

As the disclosure allows for various changes and numerous embodiments, particular embodiments will be illustrated in the drawings and described in detail in the description. However, this is not intended to limit the disclosure to particular embodiments, and it is to be appreciated that all changes, equivalents, and substitutes that do not depart from the spirit and technical scope of the disclosure are encompassed in the disclosure. In the description of the disclosure, even though shown in other embodiments, the same reference numerals are used for the same components.

Hereinafter, embodiments will be described in detail with reference to the accompanying drawings, and in the description with reference to the drawings, like reference numerals denote like elements, and redundant description thereof will be omitted.

While such terms as "first," "second," etc., may be used to describe various elements, such elements must not be limited to the above terms. The above terms are used only to distinguish one element from another.

In the embodiments below, an expression used in the singular form encompasses the expression in the plural form, unless it has a clearly different meaning in the context.

In the embodiments below, it will be further understood that the terms "comprise" and/or "have" used herein specify the presence of stated features or elements, but do not preclude the presence or addition of one or more other features or elements.

In the drawings, for convenience of description, sizes of elements may be exaggerated or contracted. For example, since sizes and thicknesses of elements in the drawings are arbitrarily illustrated for convenience of explanation, the following embodiments are not limited thereto.

In the embodiments below, an x-axis, a y-axis, and a z-axis are not limited to three axes on a rectangular coordinates system but may be construed as including these axes. For example, an-x axis, a y-axis, and a z-axis may be at right angles or may also indicate different directions from one another, which are not at right angles.

When an embodiment is implementable in another manner, a predetermined process order may be different from a described one. For example, two processes that are consecutively described may be substantially simultaneously performed or may be performed in an opposite order to the described order.

The terms used in the present specification are merely used to describe particular embodiments, and are not intended to limit the disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, a structure of a one-way clutch regenerative braking system according to an embodiment will be described with reference to FIGS. 1 to 3.

FIG. 1 is an assembly perspective view of a one-way clutch regenerative braking system according to an embodiment. FIG. 2 is a disassembled perspective view of a one-way clutch regenerative braking system according to an embodiment. FIG. 3 is a cross-sectional view of region A-A' of FIG. 1 of the one-way clutch regenerative braking system according to an embodiment, showing a state before a clutch gear and a sleeve are secured to each other.

Figure 2:
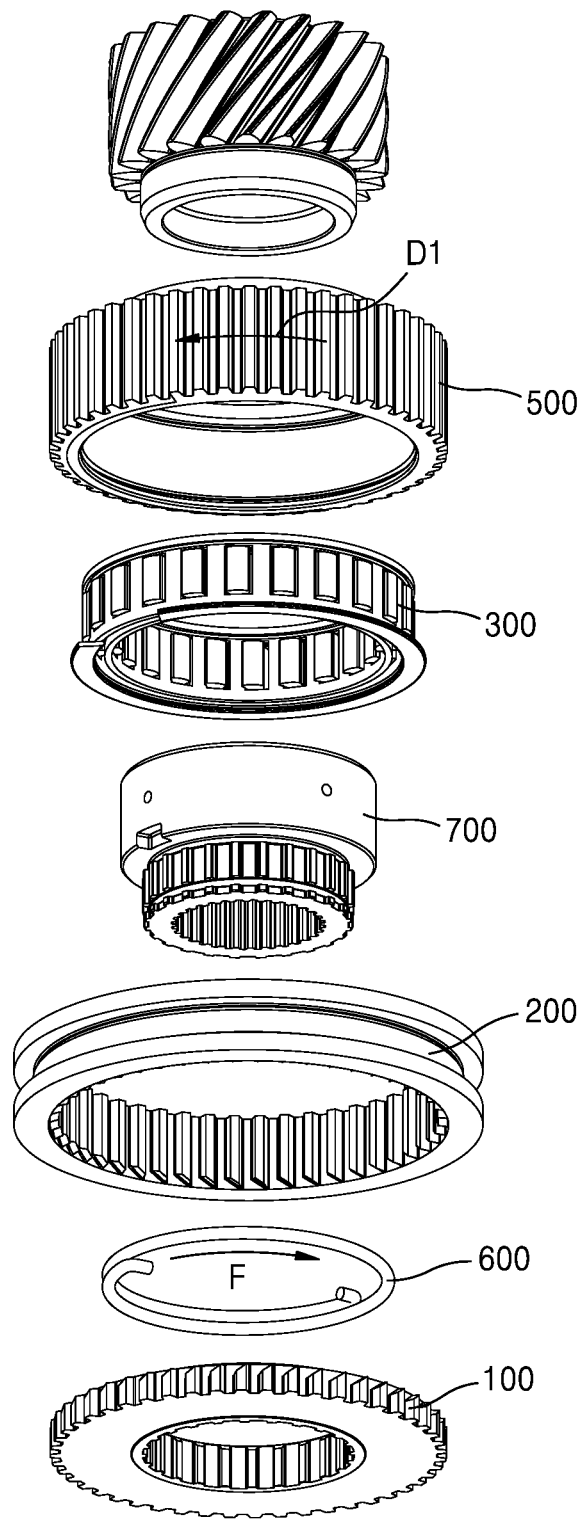
FIG. 2 is a disassembled perspective view of a one-way clutch regenerative braking system according to an embodiment.
Figure 3:
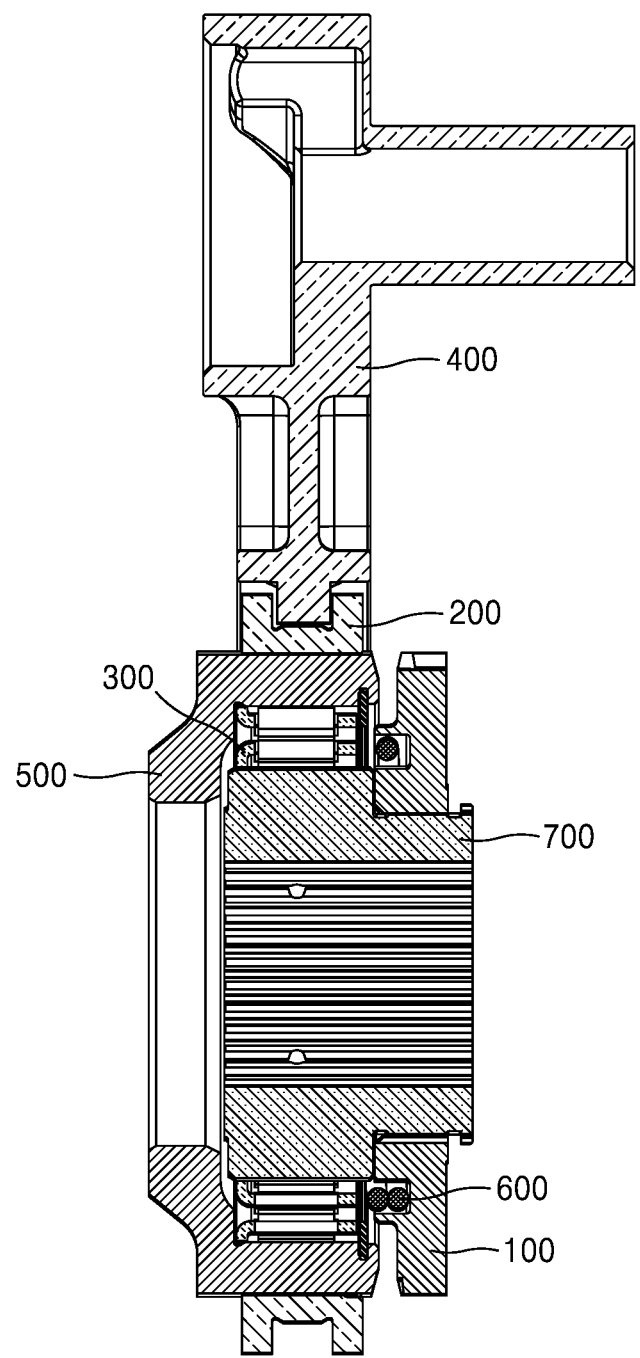
FIG. 3 is a cross-sectional view of region A-A' of FIG. 1 of the one-way clutch regenerative braking system according to an embodiment, showing a state before a clutch gear and a sleeve are secured to each other.

Referring to FIGS. 1 to 3, the one-way clutch regenerative braking system according to an embodiment includes a sleeve 200 that is arranged on an outer circumference of a hub 500 and is moved in an axial direction, a clutch gear 100 that is arranged on a side of the hub 500 and is meshed with the sleeve 200, and a one-way clutch 300 that is arranged on an inner circumference of the hub 500 and rotated in a first direction.

Here, when the sleeve 200 and the clutch gear 100 are meshed with each other, the clutch gear 100 rotates in a second direction that is opposite to the rotational direction of the one-way clutch 300.

Figure 4:
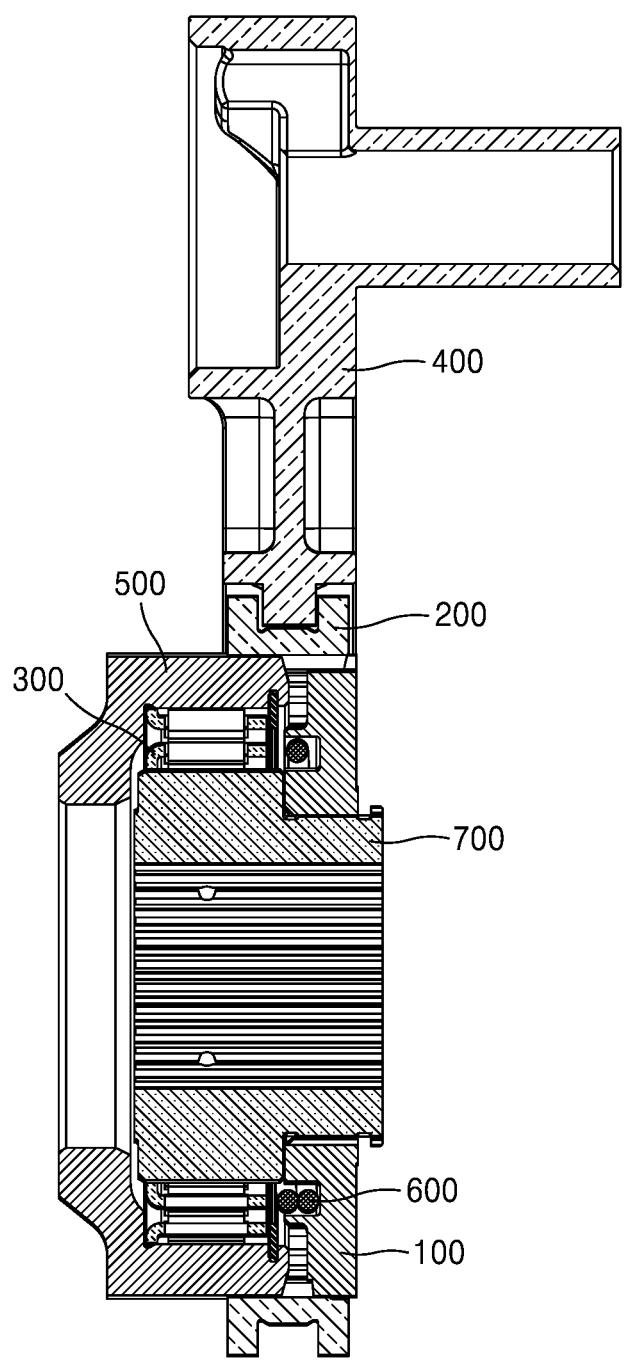
FIG. 4 is a cross-sectional view of region A-A' of FIG. 1 of the one-way clutch regenerative braking system according to an embodiment, showing a state after a clutch gear and a sleeve are secured to each other.

The fork 400 may be formed at an outermost portion of the one-way clutch regenerative braking system. The fork 400 may be coupled to the sleeve 200. During gear shifting, the fork 400 may perform gear shifting by moving the sleeve 200. The fork 400 may move the sleeve 200 on the side of the hub 500 in a direction to where the clutch gear 100 is located. A position of the sleeve 200 after being moved is illustrated in FIG. 4.

The fork 400 may mesh the sleeve 200 with the clutch gear 100 when power is transmitted to the one-way clutch 300.

The hub 500 may be formed to be rotatable about an axial direction AX of the one-way clutch regenerative braking system. The sleeve 200 formed to be slidable in the axial direction AX with respect to the hub 500 may be disposed on an outer circumferential surface of the hub 500. When the fork 400 moves the sleeve 200 in the axial direction about the hub 500, the sleeve 200 may slide with respect to the hub 500 and be meshed with the clutch gear 100 which is to be described later.

The one-way clutch 300 may be coupled to the hub 500 on an inner circumferential surface of the hub 500. The one-way clutch 300 may transmit, to the hub 500 in one direction, a rotational force transmitted through an inner race shaft 700. That is, the one-way clutch 300 may rotate the hub 500 in one direction.

The clutch gear 100 may be arranged on the side of the hub 500 and meshed with the sleeve 200. The sleeve 200 may be slid on the side of the hub 500 to mesh with the clutch gear 100. The clutch gear 100 may be mounted on the inner race shaft 700 and rotate together with the inner race shaft 700.

A torsion spring 600 may be arranged between the clutch gear 100 and the one-way clutch 300. The torsion spring 600 may apply an elastic force to the clutch gear 100. Referring to FIG. 2, the elastic force may act on the clutch gear 100 in a direction opposite to a first direction D1, which is the rotational direction of the one-way clutch 300. Accordingly, when chamfer portions, which will be described later, mesh with each other, the clutch gear 100 may be rotated in a second direction D2 by the elastic force of the torsion spring 600 and may be meshed with the sleeve 200.

Hereinafter, a chamfer structure of a one-way clutch regenerative braking system and the operation of the regenerative braking system, according to an embodiment, will be described with reference to FIGS. 3 to 7.

FIG. 3 is a cross-sectional view of region A-A' of FIG. 1 of the one-way clutch regenerative braking system according to an embodiment, showing a state before a clutch gear and a sleeve are secured to each other. FIG. 4 is a cross-sectional view of region A-A' of FIG. 1 of the one-way clutch regenerative braking system according to an embodiment, showing a state after the clutch gear and the sleeve are secured to each other.

Referring to FIGS. 3 and 4, when power is transmitted via the one-way clutch 300, the fork 400 may secure the sleeve 200 meshed with the hub 500, to the clutch gear 100. As the sleeve 200 is secured to the clutch gear 100, gear shifting may be performed.

Figure 5:
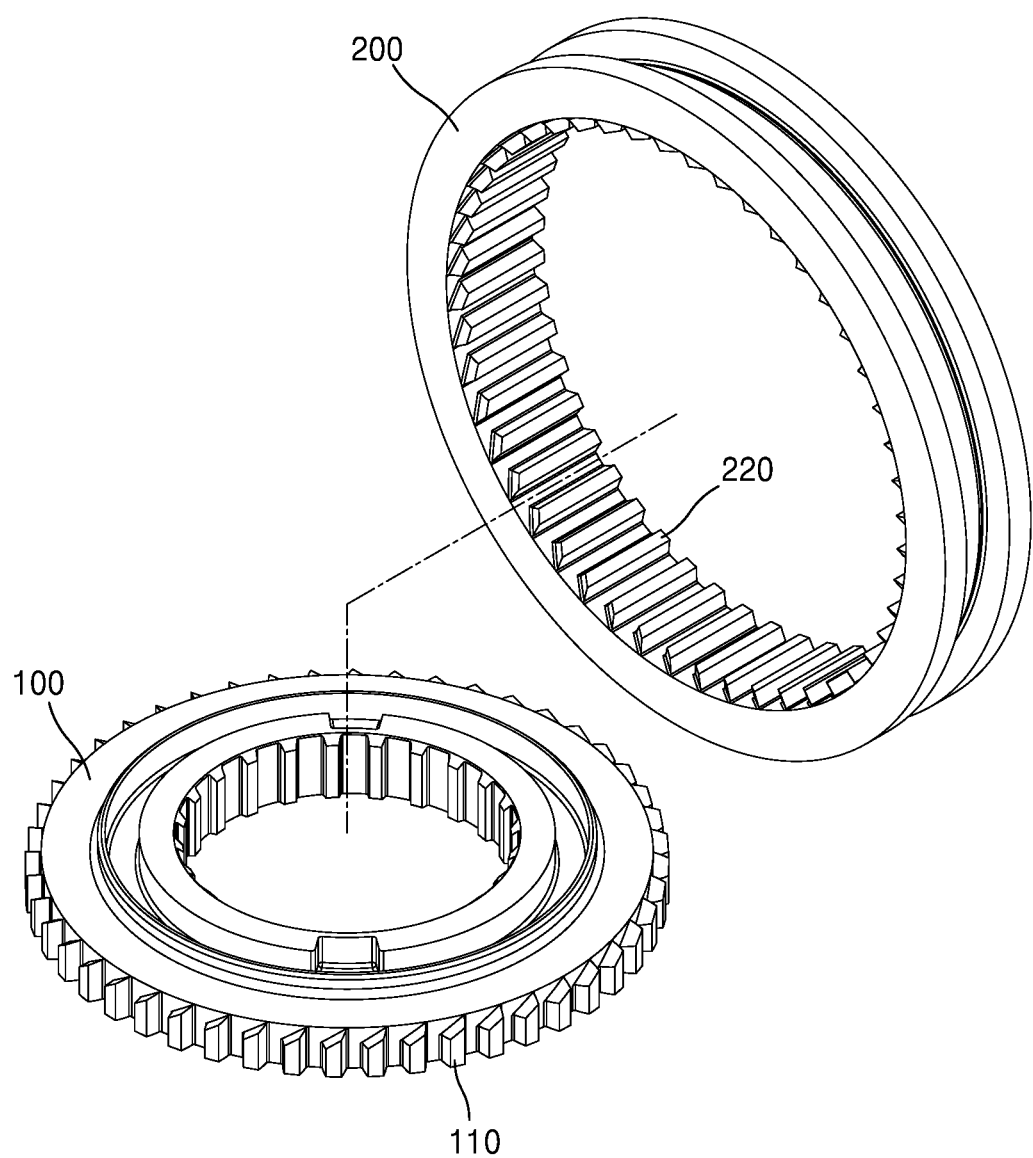
FIG. 5 is a disassembled perspective view illustrating a plurality of gear teeth of a clutch gear and a plurality of gear teeth of a sleeve, in each of which a chamfer portion is formed.
Figure 6A:
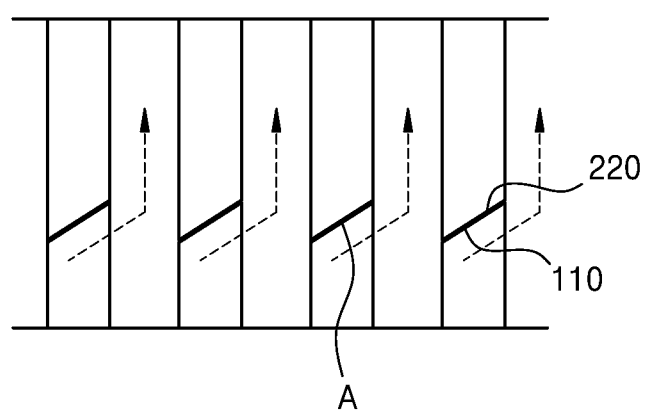
FIG. 6A is a diagram illustrating an inclined bonding surface where a first chamfer of a clutch gear and a second chamfer of a sleeve contact each other.
Figure 6B:
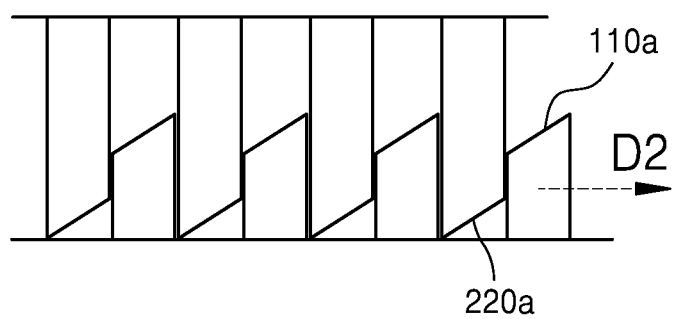
FIG. 6B is a diagram illustrating the first chamfer and the second chamfer contacting each other on the bonding surface and the clutch gear rotated in a second direction such that the clutch gear and a sleeve are meshed with each other.

FIG. 5 is a disassembled perspective view illustrating a plurality of gear teeth of a clutch gear and a plurality of gear teeth of a sleeve, in each of which a chamfer portion is formed. FIG. 6A is a diagram illustrating an inclined bonding surface where a first chamfer of a clutch gear and a second chamfer of a sleeve contact each other. FIG. 6B is a diagram illustrating the first chamfer and the second chamfer contacting each other on the bonding surface and the clutch gear rotated in the second direction D2 such that the clutch gear and a sleeve are meshed with each other.

According to an embodiment, as illustrated in FIGS. 5, 6A and 6B, the clutch gear 100 includes a plurality of gear teeth, and the plurality of gear teeth may each include a first chamfer 110a. In addition, the sleeve 200 may include a plurality of gear teeth, and the plurality of gear teeth may each include a second chamfer 210a.

Here, the first chamfer 110a and the second chamfer 210a may be formed such that a first chamfer surface and a second chamfer surface contact each other. Here, a bonding surface A where the first chamfer 110a and the second chamfer 210a contact each other may be inclined in a direction in which the sleeve 200 and the clutch gear 100 mesh with each other and a direction in which the clutch gear 100 is rotated in the second direction D2.

The sleeve 200 moved by the fork 400 may be meshed with the clutch gear 100. While the plurality of gear teeth of the sleeve 200 are meshed with the plurality of gear teeth of the clutch gear 100, the plurality of gear teeth 210 of the sleeve 200 and the plurality of gear teeth of the clutch gear 100 may contact each other. The second chamfers 210a formed on the plurality of gear teeth 210 of the sleeve 200 may push the first chamfers 110a of the plurality of gear teeth 110 of the clutch gear 100. Accordingly, while moving in the second direction D2, the plurality of gear teeth 110 of the clutch gear 100 may mesh with the plurality of gear teeth 210 of the sleeve 200, as illustrated in FIG. 6B.

Figure 7:
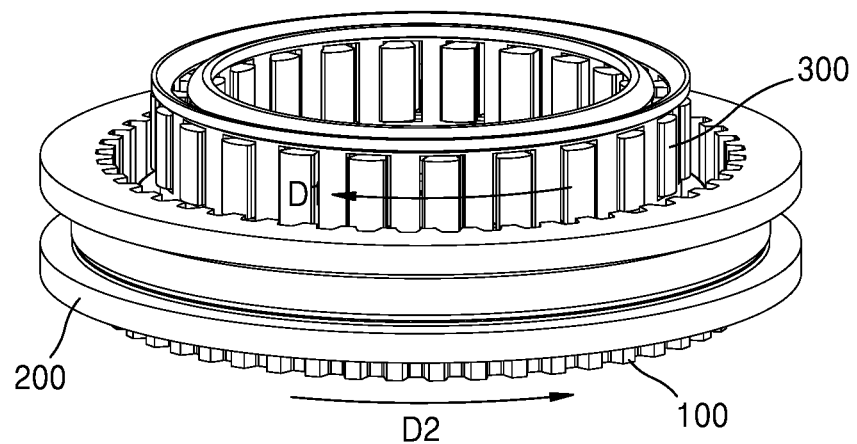
FIG. 7 is a diagram illustrating a rotational direction of a one-way clutch and a rotational direction of a clutch gear, which is opposite thereto, when a sleeve and the clutch gear are secured to each other.

FIG. 7 is a diagram illustrating a rotational direction of a one-way clutch and a rotational direction of a clutch gear, which is opposite thereto, when a sleeve and the clutch gear are secured to each other.

Referring to FIG. 7, the second direction D2 in which the clutch gear 100 is rotated when the clutch gear 100 is meshed may be opposite to the first direction D1 which is the rotational direction of the one-way clutch 300. That is, while the clutch gear 100 is meshed, the second direction in which the clutch gear 100 rotates is opposite to the first direction D1 which is the rotational direction of the one-way clutch 300, due to the inclination directions of the first chamfer 110a and the second chamfer 210a, and thus, the reverse power coming during deceleration may be used for regenerative braking.

The one-way clutch regenerative braking system described above may be mounted on an electric vehicle. In detail, the one-way clutch regenerative braking system may be a dog clutch system that allows regenerative braking through the one-way clutch regenerative braking system mounted inside a reducer, when a one-way clutch is not installed because power is transmitted reversely from the output of the reducer to an input motor during deceleration of an electric vehicle.

As described, according to the one-way clutch regenerative braking system according to an embodiment, regenerative braking is enabled only with chamfers formed in the clutch gear 100 and the sleeve 200 in addition to the basic configuration required for regenerative braking. Thus, the structure of the regenerative braking system may be simple, the volume thereof may be minimized, and the weight of the regenerative braking system may be reduced.

In addition, the responsiveness of a transmission may be improved through the one-way clutch structure, and the assembly and maintenance may be improved through the simplified system structure, and the cost of the system may be reduced.

In addition, according to the regenerative braking system by a meshing gear rotation method through chamfers, the structural stability of the system may be achieved and power loss may be minimized at the same time.

While the disclosure has been described as above with reference to the embodiment shown in the drawings, but this is only an example. It will be readily understood by those of ordinary skill in the art that various modifications and equivalent other embodiments may be made from the embodiments. Therefore, the technical scope of the disclosure should be defined based on the appended claims.

Certain technical details described with reference to the embodiments are an embodiment and do not limit the technical scope of the embodiments. In order to concisely and clearly describe the disclosure, descriptions of general techniques and configurations according to the related art may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein.

Also, the steps of all methods described herein can be performed in any suitable order unless otherwise indicated herein or otherwise clearly contradicted by context. The embodiments are not necessarily limited by the order of description of the above steps. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those skilled in this art without departing from the spirit and scope of the disclosure.

EXPLANATION OF REFERENCE NUMERALS

100: clutch gear
110: a plurality of gear teeth
110a: first chamfer
200: sleeve
210: a plurality of gear teeth
210a: second chamfer
300: one-way clutch
400: fork
500: hub
600: torsion spring
700: inner race shaft
AX: axial direction
A: bonding surface
D1: first direction
D2: second direction

The invention claimed is:

1. A one-way clutch regenerative braking system comprising:
   a sleeve which is arranged on an outer circumference of a hub and meshed constantly with the hub and moved in an axial direction;
   a clutch gear which is arranged on a side of the hub and meshed with the sleeve selectively; and
   a one-way clutch which is arranged on an inner circumference of the hub and coupled to the hub,
   wherein, when the sleeve and the clutch gear are meshed with each other, the clutch gear is rotated in a second direction,
   wherein a torsion spring is arranged between the one-way clutch and the clutch gear, and the torsion spring exerts an elastic force on the clutch gear in the second direction.

2. The one-way clutch regenerative braking system of claim 1, wherein the clutch gear comprises a plurality of gear teeth, and the plurality of gear teeth each comprise a first chamfer, and
   the sleeve comprises a plurality of gear teeth, and the plurality of gear teeth each comprise a second chamfer.

3. The one-way clutch regenerative braking system of claim 2, wherein a bonding surface where the first chamfer and the second chamfer contact each other is inclined in a direction in which the sleeve and the clutch gear are meshed with each other and in a direction in which the clutch gear is rotated in the second direction.

4. The one-way clutch regenerative braking system of claim 1, further comprising a fork that meshes the sleeve with the clutch gear when the fork performs gear shifting.

5. An electric vehicle having the one-way clutch regenerative braking system of claim 1 mounted therein.

* * * * *